United States Patent
Akenine-Möller et al.

(10) Patent No.: US 7,853,092 B2
(45) Date of Patent: Dec. 14, 2010

(54) FEATURE BLOCK COMPRESSION/DECOMPRESSION

(75) Inventors: Tomas Akenine-Möller, Lund (SE); Petrik Clarberg, Lund (SE); Jon Hasselgren, Bunkeflostrand (SE); Jacob Munkberg, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1008 days.

(21) Appl. No.: 11/652,144

(22) Filed: Jan. 11, 2007

(65) Prior Publication Data

US 2008/0170795 A1   Jul. 17, 2008

(51) Int. Cl.
G06K 9/36 (2006.01)
G06K 9/46 (2006.01)
G06K 9/38 (2006.01)

(52) U.S. Cl. .................. 382/243; 382/232; 382/251; 382/253

(58) Field of Classification Search ............ 382/232, 382/233, 243, 251, 253
See application file for complete search history.

(56) References Cited

U.S. PATENT DOCUMENTS

| | | | | |
|---|---|---|---|---|
| 5,956,431 | A | 9/1999 | Iourcha et al. | 382/253 |
| 2004/0207631 | A1* | 10/2004 | Fenney et al. | 345/584 |
| 2008/0187218 | A1* | 8/2008 | Strom | 382/166 |
| 2009/0046935 | A1* | 2/2009 | Akenine-Moller et al. | 382/235 |

OTHER PUBLICATIONS

Vittorio Castelli "Multidimensional Indexing Structures for Content-based Retrieval", IBM Research Report, RC 22208 (98723) Feb. 13, 2001.*

Munkberg et al., "High Dynamic Range Texture Compression for Graphics Hardware", ACM Transactions on Graphics, 25(3):698-706, 2006.

Munkberg et al., "High Quality Normal Map Compression", In Graphics Hardware, pp. 95-101, ACM Press, 2006.

Knittel et al., "Hardware for Superior Texture Performance", Computers & Graphics, 20(4):475-481, Jul. 1996.

Blinn, Simulation of Wrinkled Surfaces, In Proceedings of SIGGRAPH, pp. 286-292, 1978.

Roimela et al., "High Dynamic Range Texture Compression", ACM Transactions on Graphics, 25(3):707-712, 2006.

ATI. Radeon x800: 3dc white paper. Technical report, 2005.

Simon Green. Bump map compression. Technical report, NVIDIA, 2004.

I. Dryden, K. Mardia: Statistical Shape Analysis, pp. 83-87, Wiley, 1998.

K. Sayood: Introduction to Data Compression, pp. 266-268, Morgan Kaufman, 1996.

* cited by examiner

*Primary Examiner*—Samir A. Ahmed
*Assistant Examiner*—Li Liu
(74) *Attorney, Agent, or Firm*—Nixon & Vanderhye P.C.

(57) ABSTRACT

A compressor for compressing a block of feature vectors representing a feature associated with image elements, includes electronic circuitry for determining the distribution of the feature vectors, electronic circuitry for transforming each point pattern in a predetermined set of point patterns to fit the determined distribution, and a selector for selecting a transformed point pattern that best fits the determined distribution. Furthermore, an encoder represents the block of feature vectors by an identifier identifying the selected point pattern in the set of point patterns, parameters representing the transformation associated with the selected point pattern, and an index for each feature vector representing the nearest point in the transformed selected point pattern.

14 Claims, 11 Drawing Sheets

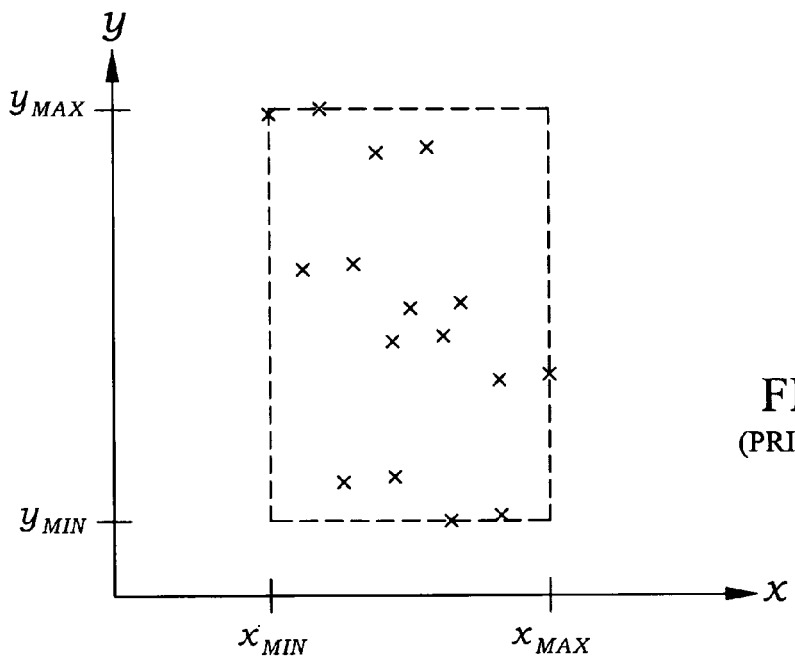
FIG. 4
(PRIOR ART)
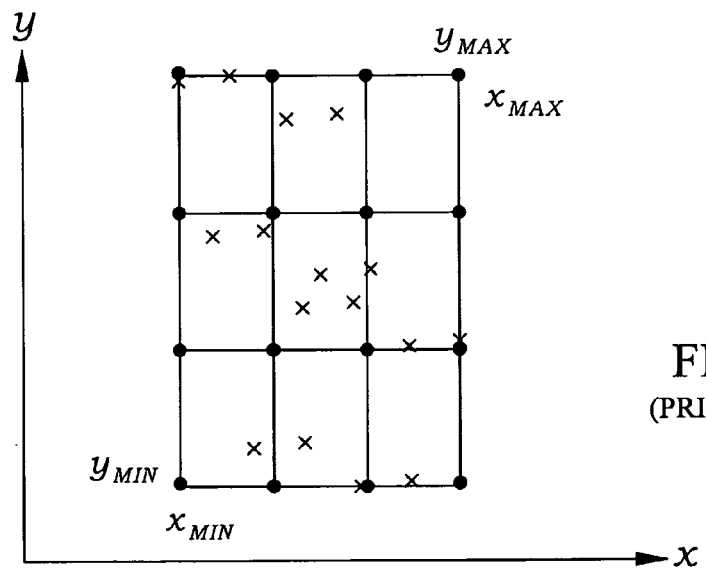
FIG. 5
(PRIOR ART)
| $x_{MIN}$ | $x_{MAX}$ | $y_{MIN}$ | $y_{MAX}$ | X-VALUE INDICES | Y-VALUE INDICES |
FIG. 6
(PRIOR ART)

ORIGINAL PATTERN

SCALED PATTERN

ROTATED PATTERN

TRANSLATED PATTERN

TRANSFORMED PATTERN

US 7,853,092 B2

FEATURE BLOCK COMPRESSION/DECOMPRESSION

TECHNICAL FIELD

The technical field relates to compression of blocks of feature vectors representing a feature associated with image elements of an image. Such blocks may represent features that control or influences the appearance of an image element, such as normals in normal maps or chrominance information in textures, but may also represent features stored in the image pixels themselves, such as color or chrominance information.

BACKGROUND

Texture compression is a technique for reducing bandwidth usage in 3D graphics. A texture image is stored in compressed form in external memory, and when a particular pixel in the texture is being accessed during 3D rendering, a block of pixels is sent in compressed form over the bus. This data is then decompressed on the fly, and used by the 3D graphics pipeline. This results in bandwidth savings, since each pixel is often stored in as little as 4 bpp (bits per pixel), compared to 24 bpp in uncompressed form. The most widely adopted texture compression (TC) scheme is known as S3TC or DXTC, see [1-2].

Normal mapping and bump mapping are similar techniques, which add detail to geometrical objects in an inexpensive way, see [3]. More specifically, a texture, called a bump map or normal map, is used at each pixel to perturb its normal. When computing the shading of a surface, lighting depends on the surface normal. In this way the surface appears to have a higher amount of geometrical detail than it actually has. To create models that can be used in, for example, realtime games, a common approach is to first create an object with rich geometrical detail. Some polygon simplification algorithm is then used to reduce the amount of geometry while keeping the general shape. The "difference" between the highly detailed geometrical object and the less detailed object can be computed and baked into a normal map. Using this normal map on the less detailed object makes for fast rendering of objects that look geometrically detailed.

Even though normal mapping reduces the complexity, the normal map still has to be stored. This requires some kind of texture compression technique for normal maps. A normal map block compression scheme called 3Dc, has been developed for this purpose, see [4]. One can also use existing DXT schemes for normal map block compression, see [5]. However, since the DXT schemes were originally designed for texture images, the results can often be quite poor.

Another application of interest is high dynamic range (HDR) images. Images in graphics are usually stored (in uncompressed mode) using 8 bits per color component, resulting in 24 bpp for RGB. However, such images can only represent a limited amount of the information present in real scenes, where luminance values spanning many orders of magnitude are common. To accurately represent the full dynamic range of an HDR image, each color component can be stored as a 16-bit floating-point number. In this case, an uncompressed HDR RGB image needs 48 bpp. Compression of such images is clearly desirable. An attempt in this direction is represented by [6].

SUMMARY

An object of the technology described herein is efficient compression of a block of feature vectors representing a feature associated with image elements of an image.

Another object is decoding of a feature vector representing an image feature from such a compressed image feature block.

Briefly, the technology described herein determines the distribution of the feature vectors and transforms each point pattern in a given set of point patterns to fit the determined distribution. The point pattern that after transformation best fits the determined distribution is selected for compression of the block. Using this point pattern, the block of feature vectors is represented by:

an identifier identifying the selected point pattern in the set of point patterns,
parameters representing the transformation associated with the selected point pattern, and
an index for each feature vector representing the nearest point in the transformed selected point pattern.

Decoding of a feature vector representing an image feature from such a compressed image feature block involves determining the point pattern identifier from the compressed image feature block to identify the predefined point pattern, determining an index from the compressed image feature block representing one of the points in the selected point pattern, determining parameters from the compressed image feature block representing the transformation of the determined point pattern and creating the decompressed feature vector by transforming the point represented by the determined index using the determined transformation parameters.

BRIEF DESCRIPTION OF THE DRAWINGS

FIG. 4 illustrates a first part of a prior art normal map block compression method;

FIG. 5 illustrates a second part of the prior art normal map block compression method;

FIG. 6 illustrates the representation of the compressed normal map block in the prior art normal map block compression method;

DETAILED DESCRIPTION

Figure 1:
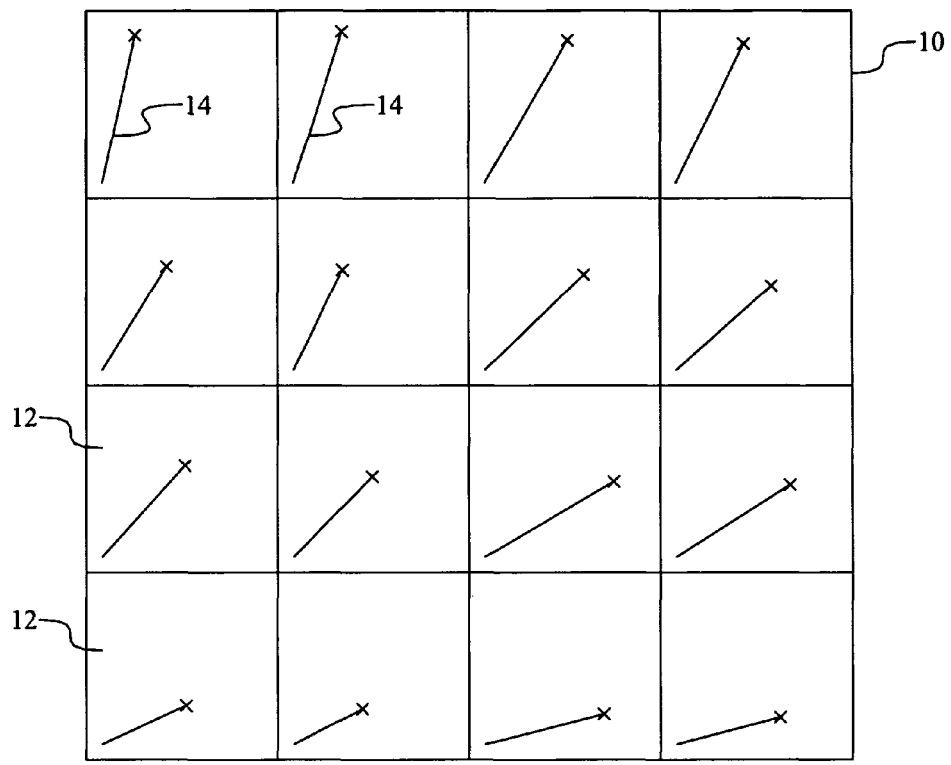
FIG. 1 is a diagram illustrating a block of feature vectors.

In the following description elements having the same or similar functions will be provided with the same reference designations in the drawings.

FIG. 1 is a diagram illustrating a block of feature vectors. The feature vectors represent a feature associated with image elements in an image. The feature may either represent a feature inherent to the image element, such as the chrominance of image elements (pixels), or a feature controlling or influencing the appearance of image elements, such as a normal map block controlling the brightness of image elements. Thus, the diagram in FIG. 1 represents either feature vectors of a part of an image or a block of feature vectors which at least partially controls the appearance of a part of an image. In FIG. 1 the block 10 includes 4×4=16 elements 12, each including a feature vector 14.

Figure 2:
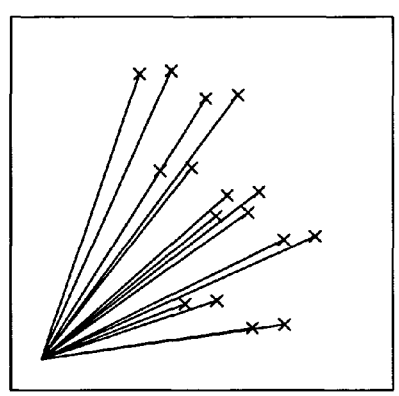
FIG. 2 is a diagram illustrating the distribution of the feature vectors illustrated in FIG. 1.

FIG. 2 is a diagram illustrating the distribution of the feature vectors in FIG. 1. In this figure the connection to the original location of each vector has been discarded. Only the distribution of the vectors is of interest.

Figure 3:
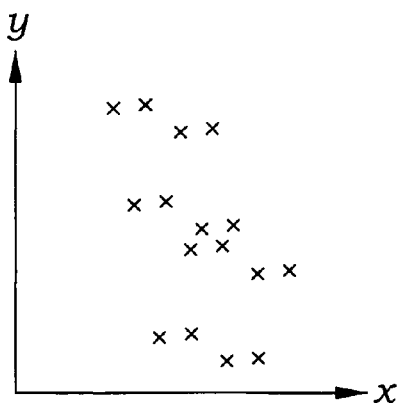
FIG. 3 is a coordinate system including the endpoints of the vectors illustrated in FIG. 2.

In FIG. 3 the endpoints of the vectors of FIG. 2 have been collected in a coordinate system. Thus, the original feature vectors are represented by the coordinates of the illustrated points in this coordinate system.

The compression method will be described with reference to normal map block compression and chrominance block compression. However, the same principles may also be applied to blocks of other features, such as projected 3D geometry on a 2D domain, spherical harmonics coefficients, displacement maps, bidirectional reflectance distribution functions (BRDF). Generally any feature that can be projected onto or represented as a set of N-dimensional coordinates (N-dimensional feature vectors) can be approximated by a set of predefined point patterns.

Now, assume that the points in FIG. 1 represent a part of a normal map. In this case the uncompressed map is represented by the points in FIG. 3. Actually the map should be called a normal map with unit length normals, since the vectors represented by the points only have two components (x,y). Since the vectors are normalized to unity, the z-component may be obtained from the equation:

$$z = \sqrt{1 - x^2 - y^2} \quad (1)$$

This computation can either be done in a pixel shader, or by special purpose hardware. In the following description the term normal map will be used to simplify the terminology.

Reference [4] describes a prior art compression method that is especially designed for compression of normal map blocks. The first step in this procedure is to determine the axis aligned boundary of the distribution of the normals (feature vectors), as illustrated in FIG. 4. This boundary is represented by the corner points $(x_{MIN}, y_{MIN})$ and $(x_{MAX}, y_{MAX})$. The next step is to distribute a grid of quantization points in this bounded region, as illustrated in FIG. 5. The compression is obtained by representing each normal by the nearest quantization point.

FIG. 6 illustrates the structure of a compressed normal map block. The first four fields contain the corner coordinates of the boundary, typically 8 bits for each coordinate value, giving a total of 32 bits for the boundary. In FIG. 5 the grid of quantization points includes only 4 quantization levels in each coordinate direction to avoid cluttering of the figure. However, in practice there may be 8 uniformly distributed quantization levels in each direction. To specify a quantization point would thus require 3 index bits for each direction, which results in a total of 16(3+3)=96 index bits. Thus, the original 4×4 normal map block is compressed into a total of 128 bits, or 8 bpp.

Figure 7:
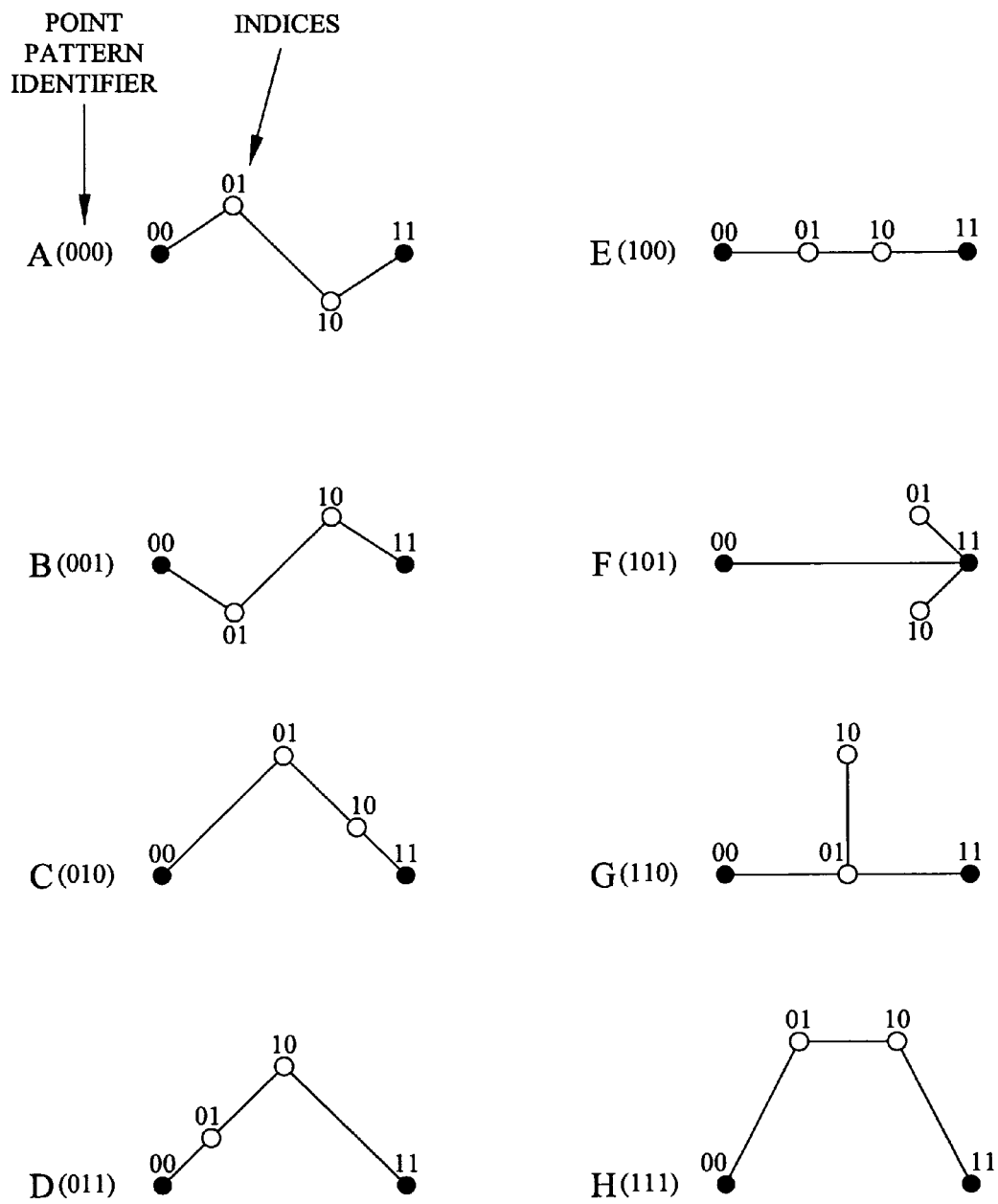
FIG. 7 illustrates a set of point patterns suitable for normal map block compression.

Instead of using a single grid for quantization of the normals, the technology described herein is based on using a set of different point patterns, as illustrated by the example in FIG. 7. Preferably at least one point pattern in the set has a non-uniform point distribution. These point patterns are transformed to fit the distribution of normals in the normal map block. The coordinates of the points in the different patterns are given in Table 1 below.

TABLE 1

| Shape | p1 | p2 | p3 | P4 |
|---|---|---|---|---|
| A | (0, 0) | (0.3, 0.2) | (0.7, −0.2) | (1, 0) |
| B | (0, 0) | (0.3, −.2) | (0.7, 0.2) | (1, 0) |
| C | (0, 0) | (0.5, 0.5) | (0.8, 0.2) | (1, 0) |
| D | (0, 0) | (0.2, 0.2) | (0.5, 0.5) | (1, 0) |
| E | (0, 0) | (0.33, 0) | (0.67, 0) | (1, 0) |
| F | (0, 0) | (0.8, 0.2) | (0.8, −0.2) | (1, 0) |
| G | (0, 0) | (0.5, 0) | (0.5, 0.5) | (1, 0) |
| H | (0, 0) | (0.3, 0.6) | (0.7, 0.6) | (1, 0) |

Figure 8:
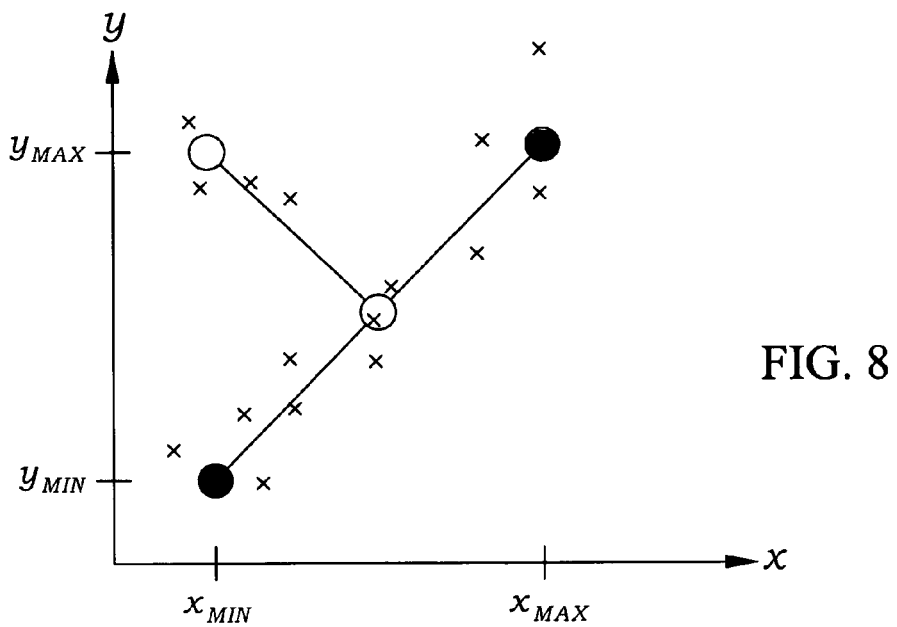
FIG. 8 illustrates one point pattern from FIG. 7 transformed to fit a block of normals from a normal map.
Figure 9A:
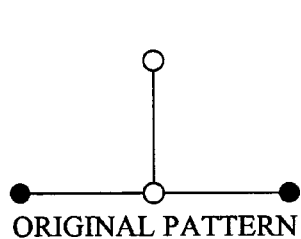
FIG. 9a-e illustrates the different operations of a point pattern transformation.
Figure 9B:
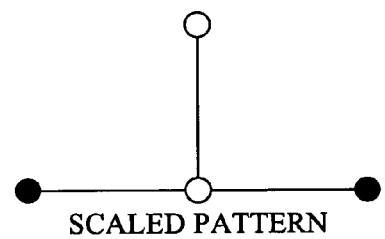
Figure 9C:
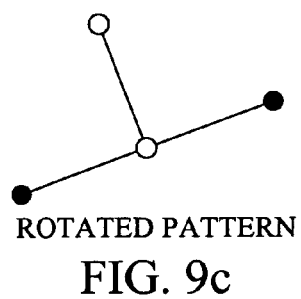
Figure 9D:
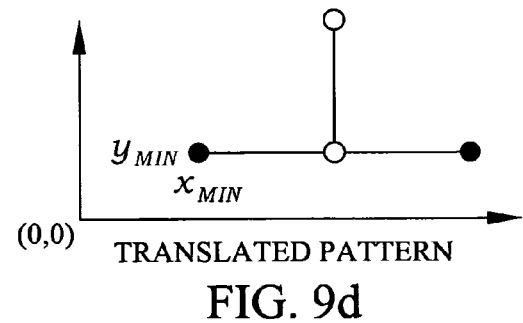
Figure 9E:
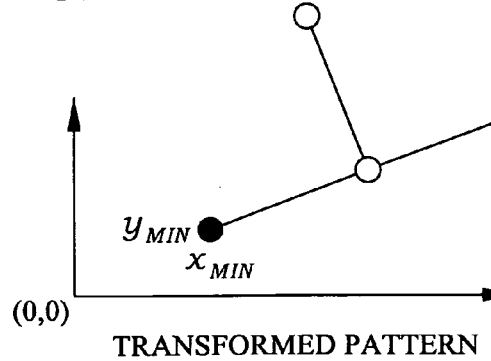

After the transformation, the point pattern that best fits the normal map block is selected for quantization of the normals. This is illustrated in FIG. 8, where point pattern G has been found to have a good fit (after transformation) to the distribution of normals. The transformation is illustrated in FIG. 9a-e. FIG. 9a illustrates the original pattern before transformation. FIG. 9b illustrates a uniformly scaled version of this pattern. FIG. 9c illustrates a rotated pattern. FIG. 9d illustrates a displaced or translated pattern. Finally, FIG. 9e illustrates a transformed point pattern, where the transformation involves a combination of uniform scaling, rotation and translation. Thus, the composite transformation may be expressed as a linear transformation.

An example method to find the transformation that gives the best fit between the normals of a normal map block and a transformed point pattern is to find the transformation that minimizes the sum of the squared distances between each normal in the map and its closest point in the transformed point pattern in an exhaustive search. This will give the minimum average quantization error for each point pattern. The pattern giving the smallest average quantization error is then used for the actual quantization.

If the computational complexity of an exhaustive search algorithm is not acceptable, there are also sub-optimal search algorithms. One such algorithm is based on clustering and Procrustes analysis. An example of this approach will be given below with reference to chrominance compression.

Figure 10:
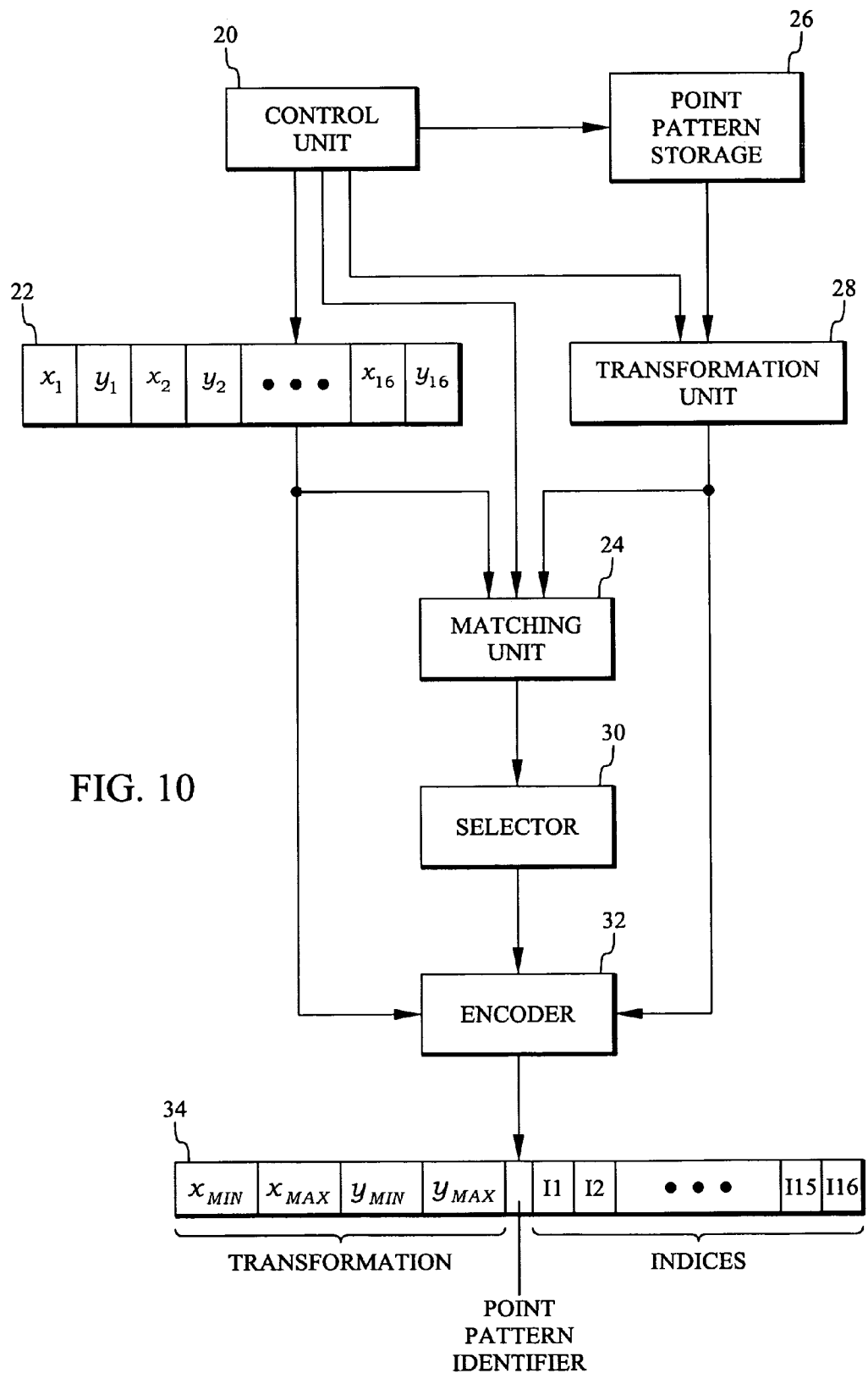
FIG. 10 is a block diagram of an example of a compressor of feature blocks.

FIG. 10 is a block diagram of a feature block compressor. A control unit 20 controls a feature block storage 22 to output the feature vectors of a block to a matching unit 24, which is also controlled by control unit 20. Furthermore, control unit 20 controls a point pattern storage 26, for example storing the point patterns in Table 1 (and FIG. 7), to output point patterns to a transformation unit 28. These transformed point patterns are forwarded to matching unit 24. Transformation unit 28 is controlled by control unit 20 to transform each point pattern with several different transformations. Matching unit 24 determines the average quantization error for each transformed point pattern. A selector 30 selects the best pattern and its corresponding transformation parameters, and an encoder 32 encodes this information into a compressed data block 34.

The compressed data block 34 is divided into sections:

One section stores the parameters defining the transformation used to transform the selected point pattern. A convenient representation is the endpoints $(x_{MIN}, y_{MIN})$ and $(x_{max}, y_{max})$ of the transformed point pattern, as illustrated in FIG. 8. At the decompressor or decoder a point $(\alpha, \beta)$ of the selected point pattern may then be transformed to its correct position with the transformation:

$$\begin{pmatrix} x \\ y \end{pmatrix} = \begin{pmatrix} x_{MAX} - x_{MIN} & -(y_{MAX} - y_{MIN}) \\ y_{MAX} - y_{MIN} & x_{MAX} - x_{MIN} \end{pmatrix} \begin{pmatrix} \alpha \\ \beta \end{pmatrix} + \begin{pmatrix} x_{MIN} \\ y_{MIN} \end{pmatrix} \quad (2)$$

Another section stores a point pattern identifier corresponding to the selected point pattern.

Finally, there is an index section with an index representing the nearest point in the selected transformed point pattern for each feature vector.

As an example, the endpoints may be represented by 8 bits for each coordinate. Referring to FIG. 7, there are 8 point patterns, which requires 3 bits for the point pattern identifier. Finally, there are 4 points in each point pattern, which requires 2 bits for each index. In this example this gives a total of 4·8+3+16·2=67 bits to represent the original 4×4 block.

Often it is desirable to have a compressed block size that is equal to $2^N$, where N is a positive integer. For example, it may be desirable to represent a compressed block in 64 bits. In the previous example this can be achieved by representing the coordinates in 7 bits and using 16 four point patterns instead of 8. This gives a total of 4·7+4+16·2=64 bits.

Figure 11:
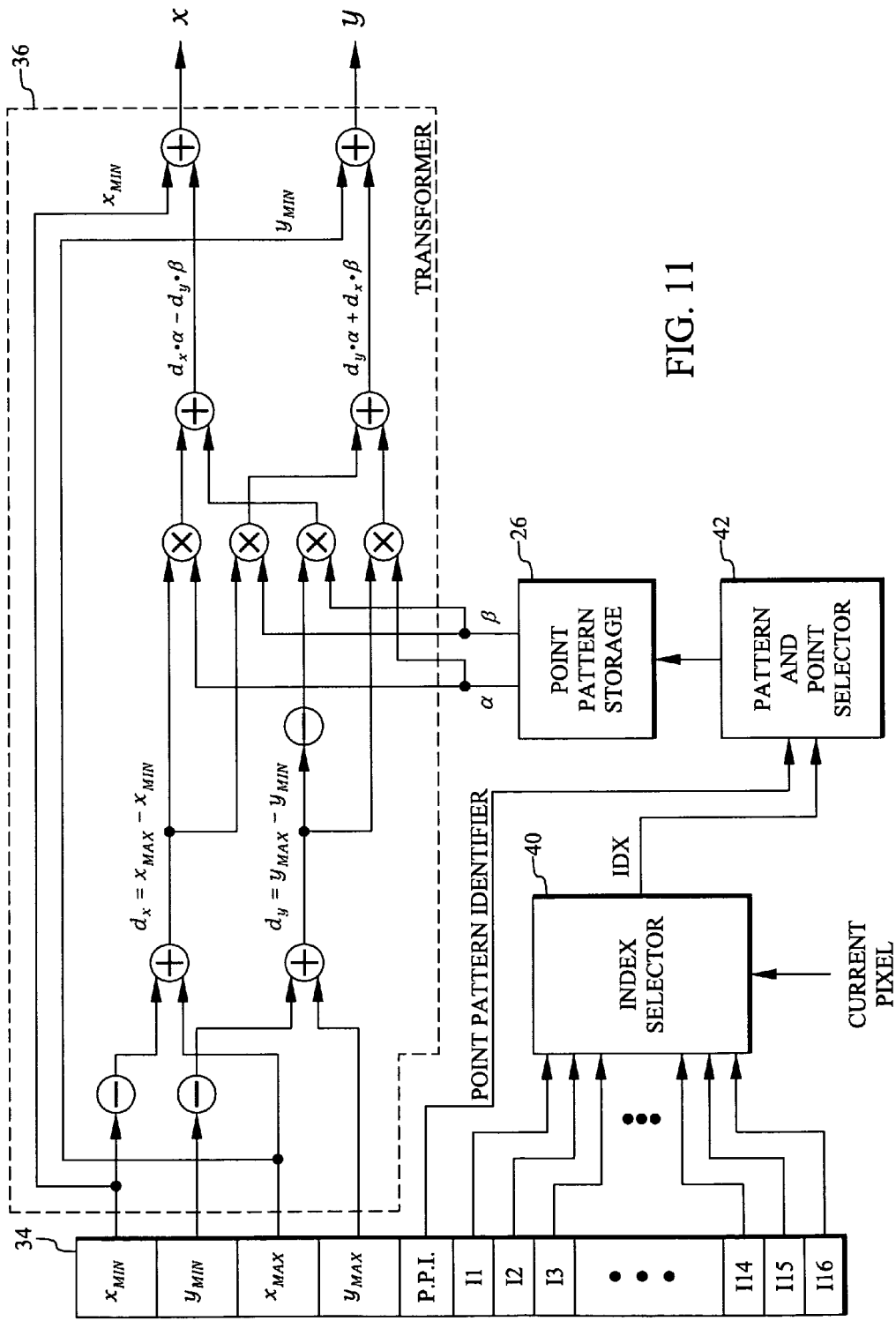
FIG. 11 is a block diagram of an example of a decompressor for decoding a feature vector of a feature block that has been compressed.

FIG. 11 is a block diagram of an example of a decompressor for decoding a feature vector of a feature block that has been compressed. The end point coordinates $x_{MIN}, x_{MAX}, y_{MIN}, y_{MAX}$ of compressed feature block 34 are forwarded to a transformer 36 implementing equation (2). The Indices I1, I2, ..., I16 are forwarded to an index selector 40. Another input of index selector 40 receives a signal identifying the point in the 4×4 feature block that is to be decoded. Index selector 40 selects the corresponding index IDX from the possible indices I1, I2, ..., I16 and forwards it to a pattern and point selector 42. The point pattern identifier is also forwarded to pattern and point selector 40. Together with index IDX this determines the desired point $(\alpha, \beta)$ from the selected point pattern. The point patterns are stored in a point pattern storage 26. Thus, the set of point patterns are stored both in the compressor and decompressor and do not have to be transferred. The selected point $(\alpha, \beta)$ is forwarded to transformer 36 and is transformed into the final decoded feature vector $(x,y)$. In this way each feature vector of a compressed block may be decoded.

Another feature that may be compressed in accordance with the principles described above is the chrominance of a block (also denoted a tile) of pixels. In the prior art the chrominance vectors of such a block have been quantized to the nearest points on a line with uniformly distributed chrominance points. However, this approximation fails if the blocks have complex chrominance variations or sharp color edges. Such blocks may be more accurately quantized if the quantizing point pattern is not restricted to a line with uniform point distribution as in [1], but can be selected from a set of different point patterns.

Figure 12:
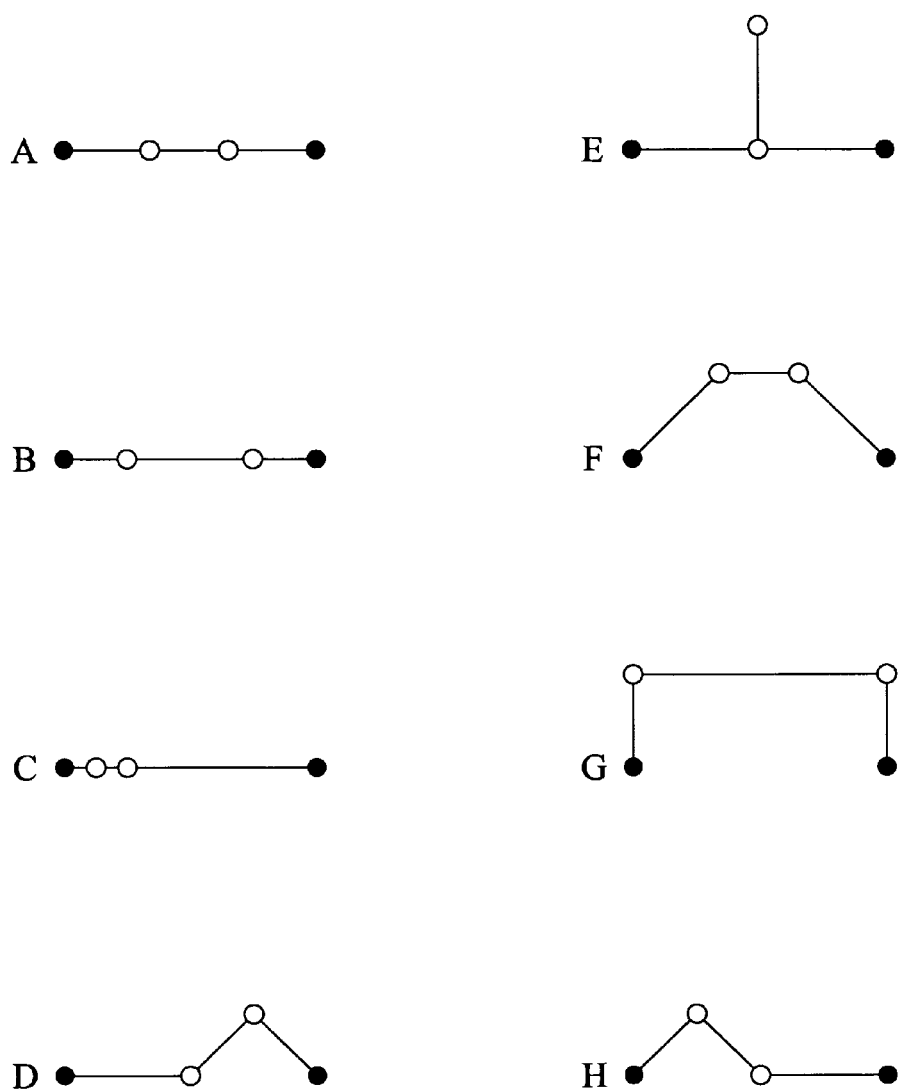
FIG. 12 illustrates a set of point patterns suitable for chrominance block compression.

It has been found that the actual set of suitable point patterns depends on the application (the feature of interest). Thus, the set of point patterns illustrated in FIG. 7 is not necessarily the optimal set for chrominance. In fact it has been found (for the same number of patterns) that a suitable set of point patterns for compressing chrominance blocks is represented by the set illustrated in FIG. 12 and specified in Table 2 below.

TABLE 2

| Shape | p1 | p2 | p3 | p4 |
|---|---|---|---|---|
| A | (0, 0) | (11/32, 0) | (21/32, 0) | (1, 0) |
| B | (0, 0) | (1/4, 0) | (3/4, 0) | (1, 0) |
| C | (0, 0) | (1/8, 0) | (1/4, 0) | (1, 0) |
| D | (0, 0) | (1/2, 0) | (3/4, 1/4) | (1, 0) |
| E | (0, 0) | (1/2, 0) | (1/2, 1/2) | (1, 0) |
| F | (0, 0) | (11/32, 11/32) | (21/32, 11/32) | (1, 0) |
| G | (0, 0) | (0, 1/2) | (1, 1/2) | (1, 0) |
| H | (0, 0) | (1/4, 1/4) | (1/2, 0) | (1, 0) |

Since the optimal set of point patterns depends on the feature of interest, a method of determining suitable patterns will now be described with reference to chrominance compression. The space of possible point patterns is very large. In order to find a selection of patterns that perform well, the chrominance content in a set of images (for example 500,000 tiles) is analyzed. First, clustering is performed to reduce the chrominance values of each tile to four chrominance points. Thereafter, the chrominance points are normalized with respect to scale and rotation to produce a large collection of point pattern candidates. Finally, the two closest candidates are iteratively merged until the desired number of point patterns remains (8 in this example). If desired, the selected point patterns may be slightly modified or "symmetrized". Although described with reference to chrominance blocks, the same method can also be used for other feature blocks, such as normal map blocks. Furthermore, the procedure is of course not limited to 8 patterns, each including 4 points. Both fewer and more patterns/points are possible, depending on the number of bits to be spent on the compressed blocks.

The compressor in FIG. 10 and the decompressor in FIG. 11 may be used also for compression and decompression, respectively, of chrominance blocks.

An advantage of the technology described herein is the offered flexibility. The set of point patterns may be chosen in such a way that they match the most frequent feature vector distributions. For example, the set of point patterns of FIG. 7 has been found work very well for normal map block compression, while the set of point patterns of FIG. 12 has been found work very well for chrominance blocks.

Figure 13:
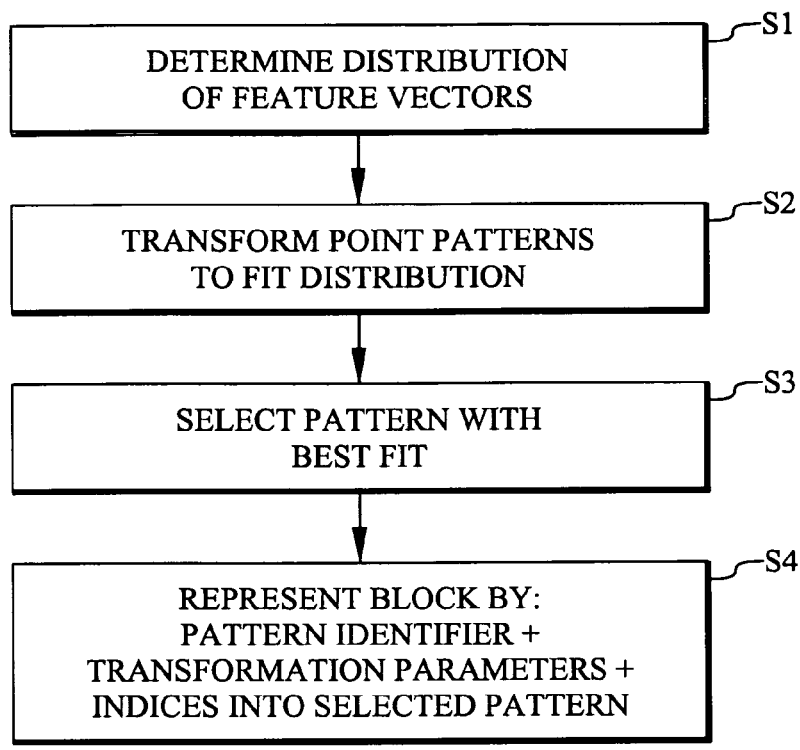
FIG. 13 is a flow chart illustrating the compression method.

FIG. 13 is a flow chart illustrating the compression method. Step 51 determines the distribution of the feature vectors in the block of interest. Step S2 transforms the different point patterns to fit this distribution. Step 53 selects the pattern having the best fit to the distribution of feature vectors. Step S4 compresses the block by representing it with a pattern identifier for the selected pattern, the transformation parameters used to fit this pattern and indices representing the closest point in the pattern for each feature vector in the block.

Figure 14:
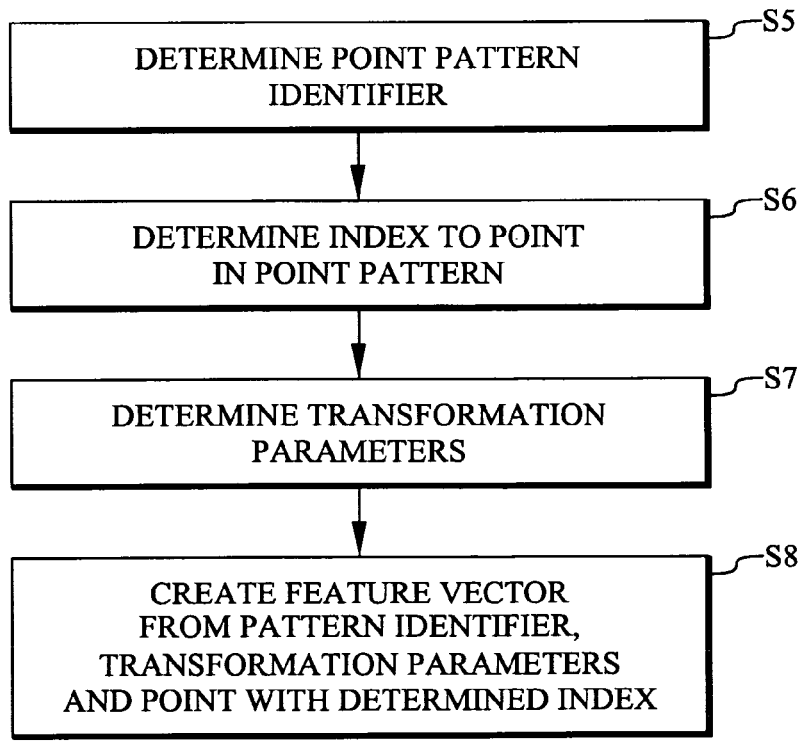
FIG. 14 is a flow chart illustrating the decompression or decoding method.

FIG. 14 is a flow chart illustrating the decompression or decoding method. Step S5 determines the point pattern identifier from the received compressed block. Step S6 determines the index into the point pattern corresponding to the feature vector to be decoded. Step S7 determines the transformation parameters. In step S8 these parameters are used to transform the indexed point in the identified point pattern to create the decoded feature vector.

Figure 15:
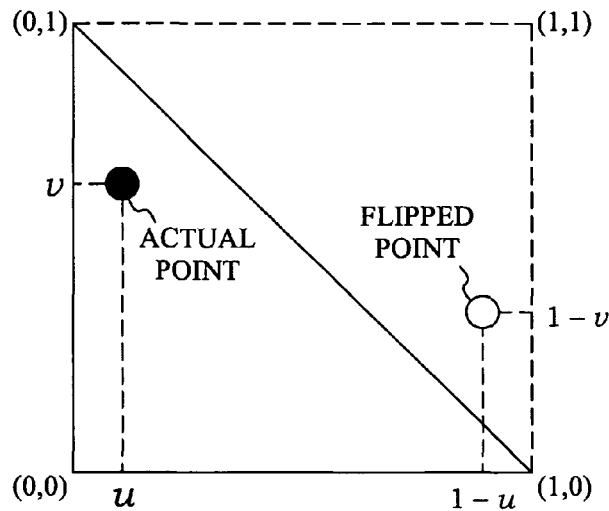
FIG. 15 is a diagram illustrating a flip method used in a preferred example embodiment.

In a preferred embodiment for chrominance block compression/decompression of for HDR images, the original (R,G,B) values are mapped into luminance/chrominance values $(\overline{Y}, \overline{u}, \overline{v})$ with the following transformation:

$$Y = \omega_r R + \omega_g G + \omega_b B \quad (3)$$

$$(\overline{Y}, \overline{u}, \overline{v}) = \left(\log_2 Y, \omega_b \frac{B}{Y}, \omega_r \frac{R}{Y}\right)$$

where $\omega_r + \omega_g + \omega_b = 1$, for example, $\omega_r = 0.299$, $\omega_g = 0.587$, $\omega_b = 0.114$. This mapping has the property that the chrominance components $(\overline{u}, \overline{v})$ both lie in the interval [0,1] and that $\overline{u} + \overline{v} \leq 1$. These properties imply that all chrominance points lie in the lower triangle of the chrominance plane, as illustrated in FIG. 15. This property may be exploited to implicitly code two bits of the pattern identifier by deliberately flipping one or both endpoints of the determined transformation into the upper triangle, as illustrated by the ring in FIG. 15. For example, if none of the endpoints are flipped, this may be associated with code "00". If one of the endpoints is flipped, this will correspond to code "01" or "10", respectively. Finally, if both endpoints are flipped, this will correspond to code "11". Thus, by determining whether the endpoints received at the decoder lie in the lower or upper triangle, two of the bits of the pattern identifier may be decoded.

Figure 16:
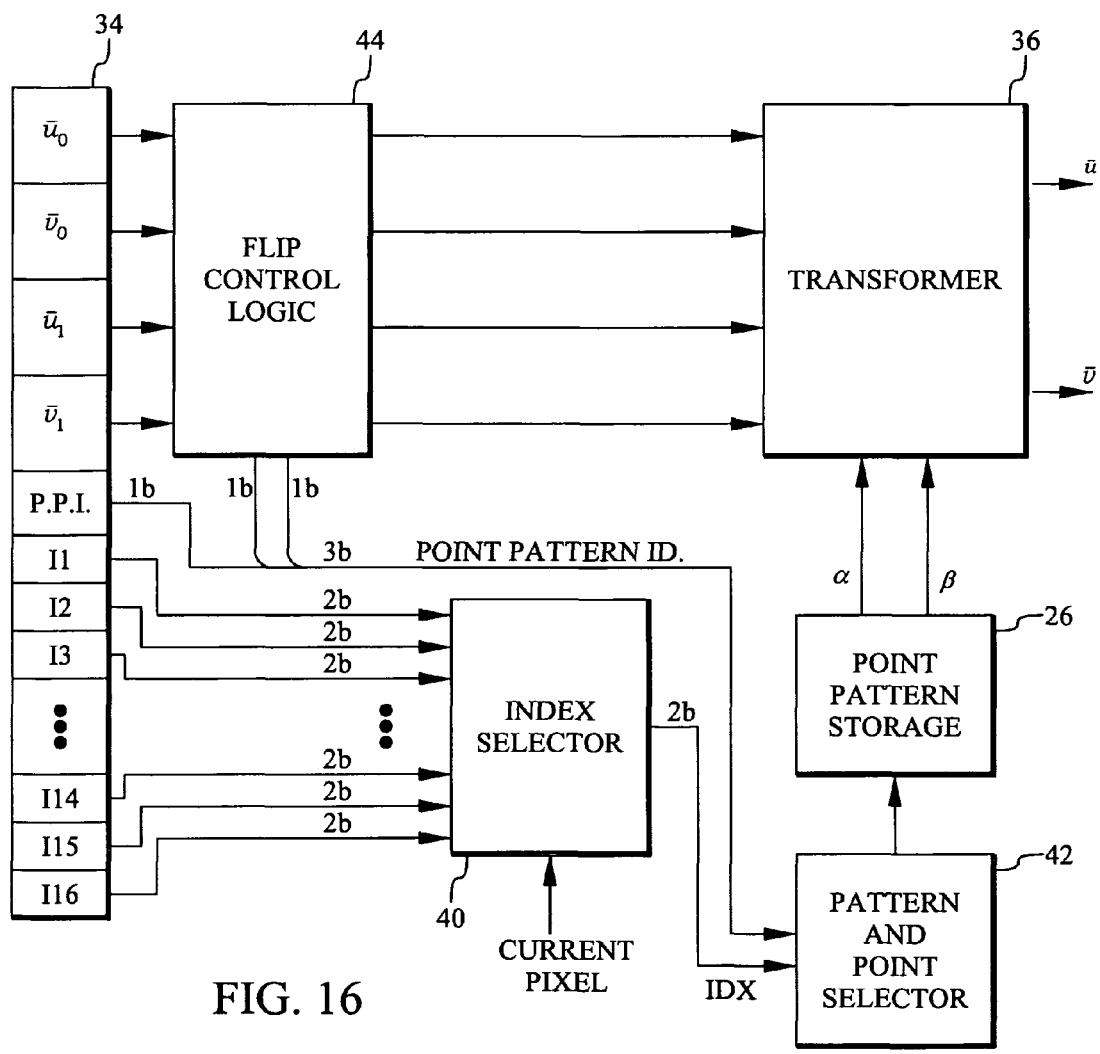
FIG. 16 is a block diagram illustrating an embodiment of the decompressor based on the flip method in FIG. 15.
Figure 17:
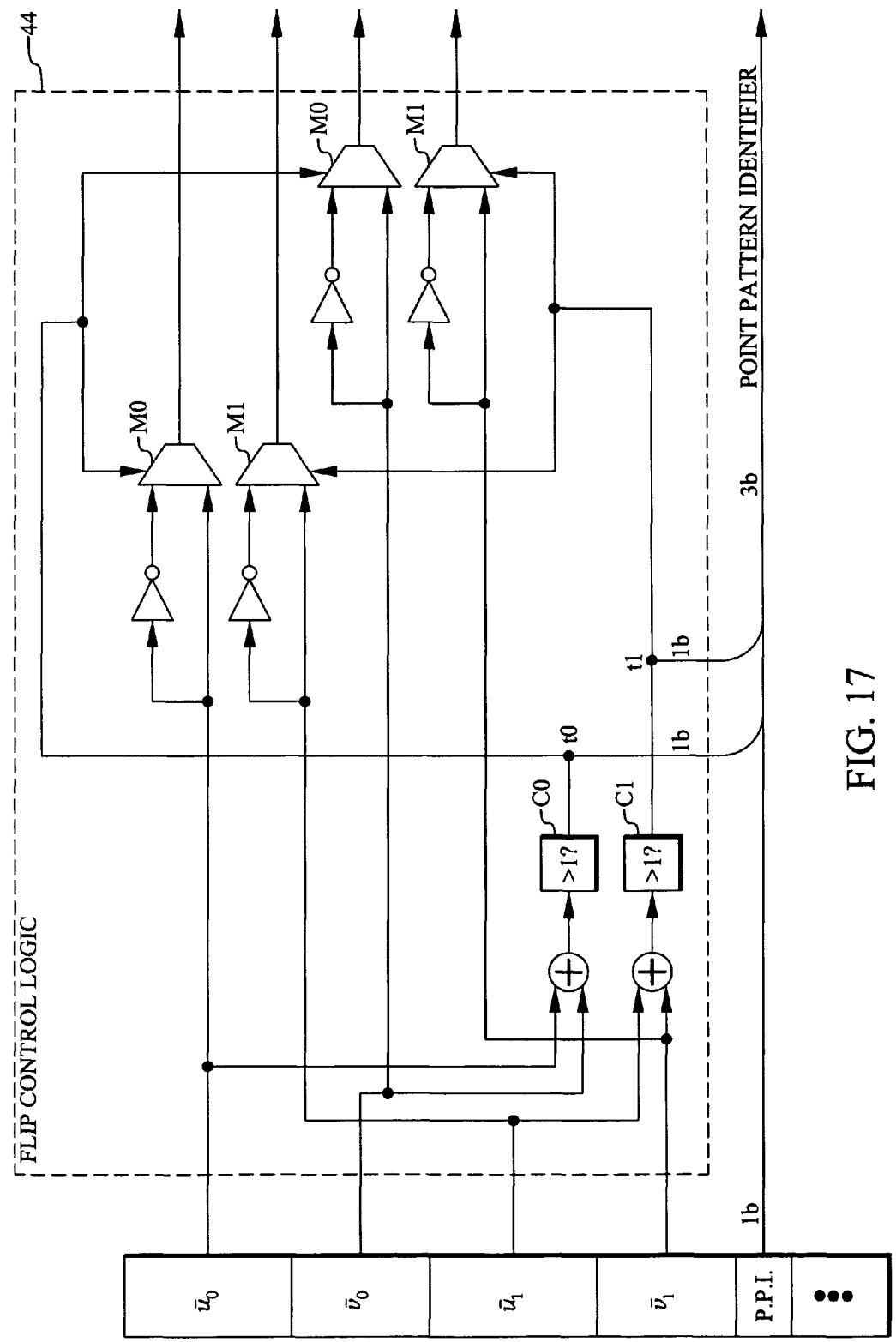
FIG. 17 is a block diagram of the flip control logic of the embodiment of FIG. 16.

FIG. 16 is a block diagram illustrating an example embodiment of the decoder based on the flip method in FIG. 15. This embodiment is similar to the embodiment of FIG. 11, the difference being that a flip control logic 44 has been inserted between compressed feature block 34 and transformer 36. As illustrated in FIG. 16 two bits of the pattern identifier are retrieved by flip control logic 44 by testing whether $\overline{u}_0 + \overline{v}_0 > 1$ and $\overline{u}_1 + \overline{v}_1 > 1$, i.e. whether one or both of the endpoints lie above the lower triangle in FIG. 15. Each of these tests produces one bit of the pattern identifier. The third bit is obtained from block 34. A detailed block diagram of the flip logic is illustrated in FIG. 17. A comparator C0 tests whether the first endpoint $(\overline{u}_0, \overline{v}_0)$ lies in the lower triangle of FIG. 15. The output signal t0 is used as one of the bits of the pattern identifier and controls two multiplexers M0 that select the endpoint unchanged or flipped, depending on the value of t0. The other endpoint $(\overline{u}_1, \overline{v}_1)$ is determined in the same way by elements C1, M1 and control signal t1.

Since the luminance information has a very large dynamic range, it is preferable to spend as many bits as possible on luminance. For example, if a total of 128 bits is used per block, the major part of these bits should be reserved for luminance coding. Thus, it is desirable to reduce the number of bits reserved for chrominance as much as possible. The above "flip trick" is one step in this direction, since it reduces the number of explicitly required bits by 2 bits, which are instead implicitly coded in the transformation parameters.

Another method to reduce the number of required bits for chrominance information is sub-sampling. According to this method the original chrominance block is divided into sub-blocks each containing a pixel and its nearest neighbor. One bit may be reserved for specifying whether each sub-block should include a horizontal or vertical neighbor (the strategy resulting in the least error is chosen). For a 4×4 tile this will reduce the number of required indices from 16 to 8. In a further embodiment the horizontal/vertical bit may be omitted and the sub-sampling is always either horizontal or vertical. Other sub-samplings techniques, such as 4×4, 1×4, etc, are also possible.

A further reduction of the number of bits required for chrominance information is obtained by observing the definition of the chrominance components $(\overline{u}, \overline{v})$ in (3). Since $\omega_r = 0.299$ and $\omega_b = 0.114$, the reconstructed color will be more sensitive to quantization errors in $\overline{u}$ than in $\overline{v}$. Thus, less bits may be spent on $\overline{v}$ than on $\overline{u}$.

Figure 18:
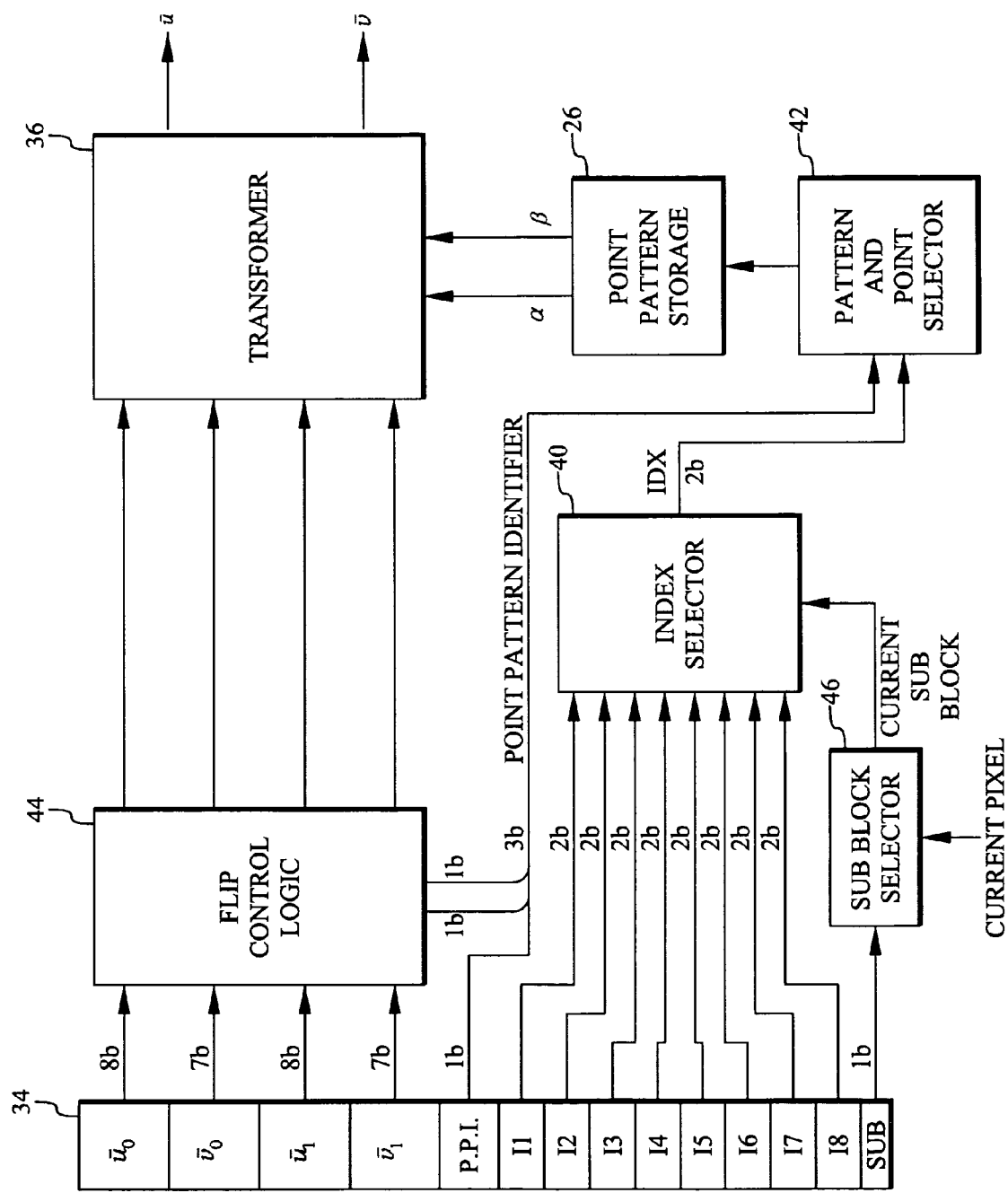
FIG. 18 is a block diagram illustrating another example embodiment of the decompressor.

FIG. 18 is a block diagram illustrating another embodiment of the decoder where the three bit reduction approaches of the preceding paragraphs have been combined. By using the "flip trick" two pattern identifying bits are obtained from the transformation parameters. Thus only 1 bit has to be explicitly signaled (assuming 8 patterns are used). Two further bits are obtained by using only 7 bits for the U values of the endpoints. Finally, by sub-sampling the tile, an extra horizontal/vertical bit is used, but this saves 8 indices. This results in only 2·(8+7)+1+1+8·2=48 bits, which leaves 128−48=80 bits for luminance coding in this example. The luminance bits may be spent as follows: 2·8 bits for the luminance endpoints and 4 luminance index bits each for the 16 pixels in the image block. During decoding a sub-block selector 46 associates the current pixel with its current sub-block (horizontal/vertical) depending on the value of a SUB bit. The determined sub-block selects the appropriate index in index selector 40.

The problem of matching point patterns to chrominance values will now be discussed in more detail. A landmark is a specific feature of an object, in our case represented as 2D coordinates. The idea behind Procrustes analysis, see [7], is to compare the shapes of objects, represented as sets of landmarks, by removing translation, rotation and scaling. The analysis finds the similarity transformations to be applied to one set of landmarks $X_1$ (point pattern coordinates) which minimize its Euclidean distance from a second set $X_2$ (chrominance values). Thus, the object is to minimize the functional:

$$\|X_2 - b X_1 R - 1_k v^T\|^2 \quad (4)$$

where b represents (linear) scaling, R represents rotation, $v^T$ represents (transposed) translation and $1_k$ represents a unit matrix of order k. The problem of finding the parameters that minimize this functional has an exact, fast solution: First, center $X_1$ and $X_2$ by subtracting the average from each coordinate. The translation v is given as the average of $X_2$ prior to centering. Form the matrix $A = X_2^T X_1$, and apply a singular value decomposition $A = VSU^T$. The transform parameters that minimize the functional above are given by:

$$R = UV^T \quad (5)$$

$$b = \frac{\text{trace}(AR)}{\text{trace}(X_1^T X_1)}$$

In the previous example there are blocks of 4×4 pixels, containing 16 chrominance values, which are sub-sampled by a factor two, so the problem is to fit a pattern with four landmarks to eight chrominance points $(\overline{u}, \overline{v}) \in [0,1]^2$. To set up the point correspondences, up to four clusters of the chrominance points are created using pnn-clustering and the k-means algorithm, see [8]. Clustering the points is an approximation of the optimal solution to the fitting problem, but it allows comparison of blocks against point patterns in constant time. Procrustes analysis needs consistent ordering of the two sets of landmark points. Therefore, each cluster is linked to a point on the point pattern. With four landmarks per pattern, the number of unique mappings is 4!=24, and all combinations are tested. In order to treat the clusters equally, the points in the point pattern may be duplicated so that the number of points is the same in the point pattern clusters and the chrominance value clusters. Another possibility is to multiply the functional (4) by a diagonal weighting matrix to account for the different number of points in the clusters.

To evaluate the quality of a determined fit of a point pattern, the error:

$$E=\Sigma((\bar{u}_O-\bar{u}_C)^2+(\bar{v}_O-\bar{v}_C)^2) \quad (6)$$

is determined, where $(\bar{u}_O,\bar{v}_O)$ are points in the original chrominance distribution and $(\bar{u}_C,\bar{v}_C)$ are the corresponding quantized points. The summation is over all points in the tile. The pattern giving the smallest error is selected for quantization or compression.

Although the technology described herein has been described with reference to linear transformations of the point patterns, it is also feasible to use non-linear transformations, such as affine or projective transformations. Furthermore, the dimensionality of the feature vectors may be higher than 2, which in turn implies higher dimensional point patterns. Examples are: RGB color data, volume color data for 3D rendering, color data in other color spaces (YUV, CMYK, HSV), vector fields.

The functionality of the compressor and decoder is typically implemented in a dedicated graphics processor, but may also be implemented by a micro processor or micro/signal processor combination and corresponding software. Another possibility is a application specific integrated circuit (ASIC). The compression/decompression may also be performed by software on general computing devices.

In the description above the feature of interest is typically stored in blocks that are external to the actual image, e.g. normal maps and chrominance textures, but control or influence the appearance of the image. However, the same principles may also be used directly on image blocks, for example on chrominance information stored in the image or on the RGB vectors themselves. In both situations the feature of interest is associated with the elements of the image.

The technology described herein is also applicable to blocks of higher dimensionality than 2, for example 3-dimensional blocks (volumes).

Comparison of the compression in accordance with the technology described herein with the conventional prior art has shown that on the average the mPSNR (multi-exposure Peak Signal-to-Noise Ratio) is at least 0.5 dB higher for the present invention, see [9]. For normal map block compression an improvement of 2 dB in PSNR (Peak Signal-to-Noise Ratio) has been obtained.

It will be understood by those skilled in the art that various modifications and changes may be made to the technology described herein without departure from the appended claims.

REFERENCES

[1] Konstantine Iourcha, Krishna Nayak, and Zhou Hong. System and Method for Fixed-Rate Block-based Image Compression with Inferred Pixels Values. In U.S. Pat. No. 5,956,431, 1999.
[2] G. Knittel, A. Schilling, A. Kugler, and W. Strasser. Hardware for Superior Texture Performance. Computers & Graphics, 20(4):475-481, July 1996.
[3] Jim Blinn. Simulation of Wrinkled Surfaces. In Proceedings of SIGGRAPH, pages 286-292, 1978.
[4] ATI. Radeon x800: 3dc white paper. Technical report, 2005.
[5] Simon Green. Bump map compression. Technical report, NVIDIA, 2004.
[6] Kimmo Roimela, Tomi Aarnio, and Joonas Itaranta. High dynamic range texture compression. ACM Transactions on Graphics, 25(3):707-712, 2006.
[7] I. Dryden, K. Mardia: Statistical Shape Analysis, pp 83-87, Wiley, 1998.
[8] K. Sayood: Introduction to Data Compression, pp 266-68, Morgan Kaufman, 1996.
[9] Jacob Munkberg, Petrik Clarberg, Jon Hasselgren, and Tomas Akenine Möller. High dynamic range texture compression for graphics hardware, ACM Transactions on Graphics, 25(3):698-706, 2006.

The invention claimed is:

1. A method of compressing a block of feature vectors representing a feature associated with image elements of an image, including using a processor to perform the steps of:
    determining a distribution of the feature vectors;
    transforming each point pattern in a predetermined set of point patterns to fit the determined distribution;
    selecting a transformed point pattern that best fits the determined distribution;
    representing the block of feature vectors by
        an identifier identifying the selected point pattern in the set of point patterns,
        parameters representing the transformation associated with the selected point pattern, and
        an index for each feature vector representing the nearest point in the transformed selected point pattern.

2. The method of claim 1, wherein at least one point pattern in the set has a non-uniform point distribution.

3. The method of claim 1, wherein the transformation is a linear transformation.

4. The method of claim 1, wherein the feature vectors are two-dimensional.

5. The method of claim 1, wherein the identifier is at least partially represented by the parameters representing the transformation.

6. The method of claim 1, wherein the feature represents a normalized surface normal.

7. The method of claim 1, wherein the feature represents chrominance.

8. A compressor for compressing a block of feature vectors representing a feature associated with image elements, including:
    means for determining a distribution of the feature vectors;
    means for transforming each point pattern in a predetermined set of point patterns to fit the determined distribution;
    a selector for selecting a transformed point pattern that best fits the determined distribution;
    an encoder for representing the block of feature vectors by
        an identifier identifying the selected point pattern in the set of point patterns,
        parameters representing the transformation associated with the selected point pattern, and
        an index for each feature vector representing the nearest point in the transformed selected point pattern.

9. A method of decoding a feature vector representing an image feature from a compressed image feature block, including using a processor to perform the steps of:
    determining a point pattern identifier from the compressed image feature block to identify a predefined point pattern;
    determining an index from the compressed image feature block representing one of the points in the selected point pattern;

determining parameters from the compressed image feature block representing a transformation of the determined point pattern;

creating the feature vector by transforming the point represented by the determined index using the determined parameters.

10. The method of claim 9, wherein the feature represents a normalized surface normal.

11. The method of claim 9, wherein the feature represents chrominance.

12. A decoder for decoding a feature vector representing an image feature from a compressed image feature block, including:

means for determining a point pattern identifier from the compressed image feature block to identify a predefined point pattern;

an index selector for determining an index from the compressed image feature block representing one of the points in the selected point pattern;

means for determining parameters from the compressed image feature block representing a transformation of the determined point pattern;

means for creating a feature vector by transforming the point represented by the determined index using the determined parameters.

13. A compressor for compressing a block of feature vectors representing a feature associated with image elements, comprising electronic circuitry configured to:

determine a distribution of the feature vectors;

transform each point pattern in a predetermined set of point patterns to fit the determined distribution;

select a transformed point pattern that best fits the determined distribution;

represent the block of feature vectors by an identifier identifying the selected point pattern in the set of point patterns, parameters representing the transformation associated with the selected point pattern, and an index for each feature vector representing the nearest point in the transformed selected point pattern.

14. A decoder for decoding a feature vector representing an image feature from a compressed image feature block, comprising electronic circuitry configured to:

determine a point pattern identifier from the compressed image feature block to identify a predefined point pattern;

determine an index from the compressed image feature block representing one of the points in the selected point pattern;

determine parameters from the compressed image feature block representing a transformation of the determined point pattern; and create a feature vector by transforming the point represented by the determined index using the determined parameters.

* * * * *

UNITED STATES PATENT AND TRADEMARK OFFICE
CERTIFICATE OF CORRECTION

PATENT NO. : 7,853,092 B2
APPLICATION NO. : 11/652144
DATED : December 14, 2010
INVENTOR(S) : Akenine-Moller et al.

It is certified that error appears in the above-identified patent and that said Letters Patent is hereby corrected as shown below:

In Column 5, Line 5, delete "$(x_{max}, y_{max})$" and insert -- $(x_{MAX}, y_{MAX})$ --, therefor.

In Column 7, Line 40, delete "tO." and insert -- t0. --, therefor.

In Column 9, Line 6, in Equation (6), delete "$E = \Sigma((\bar{u}_O - \bar{u}_C)^2 + (\bar{v}_O - \bar{v}_C)^2$" and insert -- $E = \Sigma((\bar{u}_O - \bar{u}_C)^2 + (\bar{v}_O - \bar{v}_C)^2)$ --, therefor.

In Column 9, Line 8, delete "$(\bar{u}_O, \bar{v}_O)$" and insert -- $(\bar{u}_O, \bar{v}_O)$ --, therefor.

Signed and Sealed this
Seventeenth Day of April, 2012

David J. Kappos
*Director of the United States Patent and Trademark Office*